(12) United States Patent
Englot

(10) Patent No.: US 8,277,111 B1
(45) Date of Patent: Oct. 2, 2012

(54) MICROINGREDIENT DISPENSING SYSTEM

(75) Inventor: Derrick A Englot, Saskatoon (CA)

(73) Assignee: Comco Manufacturing, Ltd., Saskatoon, Saskatchewan (CA)

( * ) Notice: Subject to any disclaimer, the term of this patent is extended or adjusted under 35 U.S.C. 154(b) by 1036 days.

(21) Appl. No.: 12/239,371

(22) Filed: Sep. 26, 2008

Related U.S. Application Data

(60) Provisional application No. 60/978,714, filed on Oct. 9, 2007.

(51) Int. Cl.
*B01F 3/12* (2006.01)
(52) U.S. Cl. .................... 366/138; 366/165.1; 366/178.1
(58) Field of Classification Search .......... 366/108–114, 366/138, 139, 140, 141, 163.1, 165.1, 165.2, 366/165.3, 165.4, 165.5, 174.2, 174.1, 175.1, 366/175.2, 175.3, 177.1, 178.1, 178.2, 178.3; 414/21
See application file for complete search history.

(56) References Cited

U.S. PATENT DOCUMENTS

| | | | | |
|---|---|---|---|---|
| 2,290,712 | A * | 7/1942 | Robinson, Jr. ................ | 222/615 |
| 3,822,056 | A * | 7/1974 | Hawes et al. ................. | 366/114 |
| 4,002,270 | A * | 1/1977 | Reiner .......................... | 222/58 |
| 4,733,971 | A * | 3/1988 | Pratt ............................ | 366/141 |
| 5,340,211 | A | 8/1994 | Pratt | |
| RE34,776 | E * | 11/1994 | Pratt ............................ | 366/141 |
| 5,718,507 | A * | 2/1998 | Gian ............................ | 366/131 |
| 5,853,244 | A * | 12/1998 | Hoff et al. .................... | 366/141 |
| 7,325,967 | B2 * | 2/2008 | Hoff et al. .................... | 366/141 |
| 7,537,375 | B2 * | 5/2009 | Hoff et al. .................... | 366/141 |

OTHER PUBLICATIONS

Eriez, "Eriez' Model 26C Vibratory Feeder with Unique Hi-Vi Magnetic Drive Circuit Provides Stability, Control and Accuracy," Apr. 20, 2006, pp. 1-3, publisher and publication location unknown.
Jim Mitchell, "Vibratory tray feeders: Ten common problems and how to fix them," Jan. 5, 2007, pp. 1-7, publisher and publication location unknown.
Robert R. McEllhiney, "Mill Management: Micro systems—Revolutionizing proportioning," Feed Management, Mar. 1985, vol. 36, No. 3, pp. 54-58, publisher and publication location unknown.
Hough Kennebec Int'l, "The Hough Micro Weighing System," date unknown (but pre-1990), pp. 1-4, West Hartford, Connecticut.
Prater, "Blue Streak Feed Processor: The Accurate One!," date unknown (but pre-1990), pp. 1-2, publisher and publication location unknown.
Weigh-Tronix, "Weigh-Tronix's revolutionary SFM-2000 Ration Master Stationary Feed Mixer," date unknown (but pre-1990), pp. 1-2, publisher and publication location unknown.

(Continued)

*Primary Examiner* — Yogendra Gupta
*Assistant Examiner* — Emmanuel S Luk
(74) *Attorney, Agent, or Firm* — Eric W. Cernyar

(57) ABSTRACT

Several improvements are provided for a microingredient additive dispensing system. One improvement is the use of a fluid eductor to entrain and mix the additives. Another improvement is to weigh and dispense ingredients using one or more non-compartmentalized vibratory trays that are mounted on a single weigh frame. Another improvement is a summing and filtering circuit that sums and filters the signals from four different load cells to accurately determine the weight of the dispensed additives. Yet another improvement is the placement of a pump upstream of the eductor, isolating the pump from additives that are pumped to the feed mixing station. Another improvement is a line-flushing mode in which a turbulent mixture of air and water are used to clean the delivery conduit of residue.

11 Claims, 10 Drawing Sheets

OTHER PUBLICATIONS

K-Tron Corp., "All Digital Loss-in-Weight Feeding," date unknown (but pre-1990), pp. 1-3, publisher and publication location unknown.

Acrison, "Model 311 Continuous Blending Systems," date unknown (but pre-1990), p. 1, publisher and publication location unknown.

John Pfeiffer, Sr., "Automating the Pelleting Process," Feed Management, Jul. 1986, vol. 37, No. 7, pp. 9-10, publisher and publication location unknown.

Carl Anderson, "Micro Ingredient Control," Feed Management, date unknown, volume and issue number unknown, pp. 20, 22, 24, plus unnumbered advertisement, publisher and publication location unknown.

Hickman'S Micro System, Inc., "The Hickman Micro System," date unknown (but pre-1990), pp. 1-4, Hickman, Gordo, Alabama.

Acrison, Inc., "System Responsibility . . . From Bulk Storage to the Precision Metering of Dry Materials," date unknown (but pre-1990), pp. 1-4, publication location unknown.

* cited by examiner

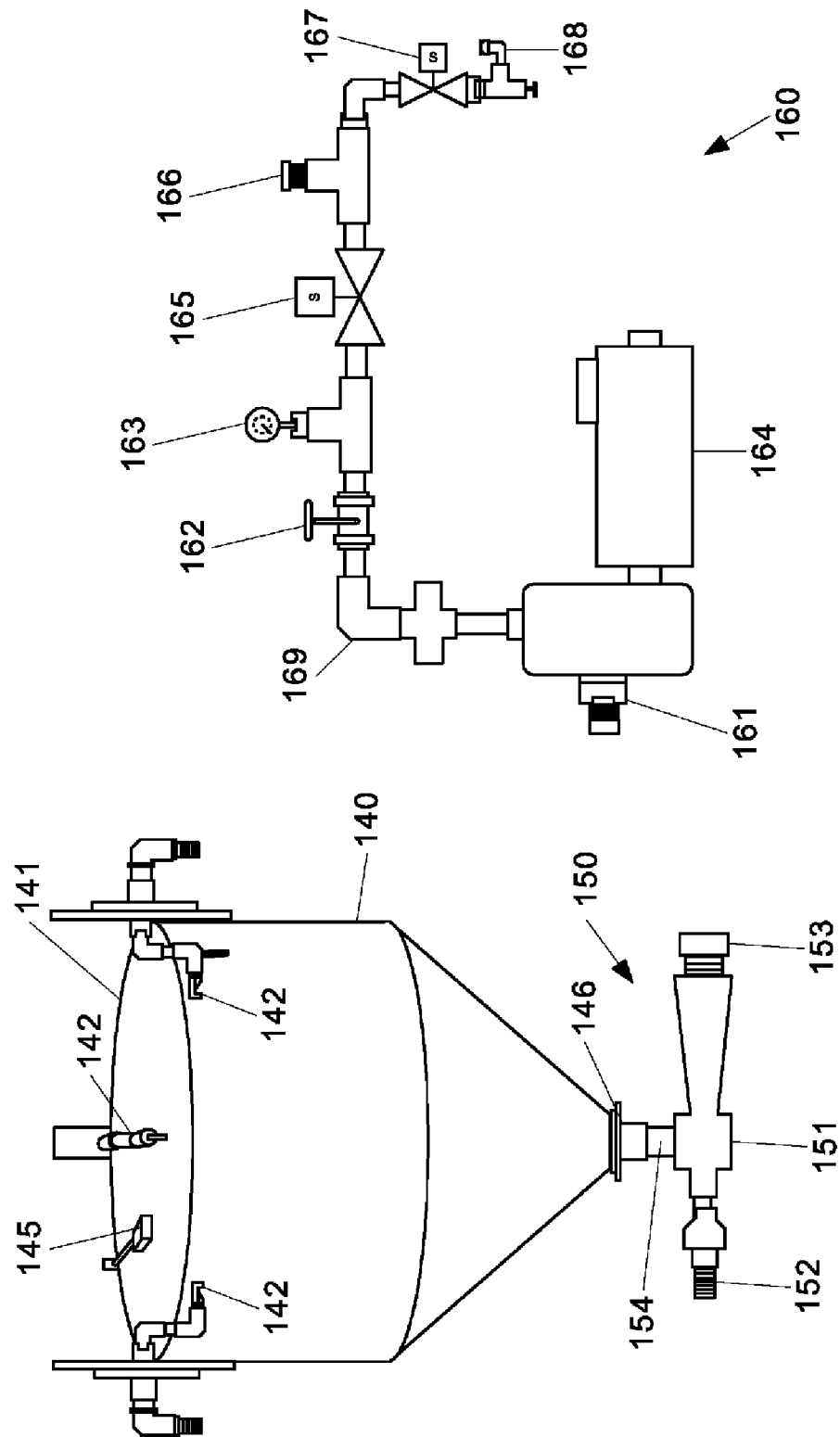

MICROINGREDIENT DISPENSING SYSTEM

RELATED APPLICATIONS

This application claims the benefit of, and herein incorporates by reference, U.S. Provisional Patent Application No. 60/978,714, entitled "Microingredient Dispensing System," filed on Oct. 9, 2007.

FIELD OF THE INVENTION

This invention relates generally to microingredient dispensing systems, and more particularly to improvements in mechanisms for mixing the microingredients.

BACKGROUND OF THE INVENTION

Many prior art micro-ingredient dispensing systems include a plurality of dry microingredient containers that dispense their additives into a rotatable compartmentalized hopper, which then dumps the additives into a mixing tank. In the mixing tank, the dispensed additives are actively mixed with water to disperse and suspend the additives in the water to create a slurry. After the slurry is formed, a pump in a line between the mixing tank and a receiving station delivers the slurry to a receiving station, where it is deposited onto a feed ration.

SUMMARY OF THE INVENTION

The inventor has developed several improvements over the prior art microingredient dispensing system described above. It should be understood that the invention may encompass any combination of these improvements. One improvement is to replace the traditional mixing tank with a catch basin and fluid eductor. In one embodiment, a water eductor utilizes the kinetic energy of a pressurized liquid to entrain another liquid, mix the two, and discharge the mixture through a delivery conduit toward a feed mixing station. The turbulence in the water eductor results in a rapid and thorough mixing of the ingredients with the liquid. In another embodiment, an air eductor utilizes the kinetic energy of a pressurized stream of air to entrain dry microingredients, mix the two, and discharge the additive-bearing air flow through the delivery conduit toward the feed mixing station.

Another improvement is the use of one or more non-compartmentalized vibratory trays that are mounted on a single weigh frame, and vibrating (rather than rotating) the trays to discharge additives into the catch basin. Another improvement is a summing and filtering circuit that sums and filters the signals from four different load cells to accurately determine the weight of the dispensed additives.

Yet another improvement is the placement of the pump upstream of the eductor. This configuration isolates the pump from, and prevents contamination of the pump by, additives that are pumped to the feed mixing station. Another improvement is the development of a line-flushing mode in which the turbulent mixture of air and water are used to clean the delivery conduit of residue.

Still other improvements and inventive aspects in the present disclosure will be apparent to those of ordinary skill in the art.

Many of these improvements are incorporated into a microingredient dispensing system. The system includes a micro bin stand comprising a frame that supports six or more dry microingredient bins, a weigh subframe, a stainless steel catch basin, and a pressure-pump-powered eductor that uses water pressure to generate suction at the top of the valve. The weigh subframe is a single weigh scale that supports two slightly inclined "vibratory feeders." Microingredients are dispensed, one at a time, from the microingredient bins into the vibratory feeders, where the dispensed microingredients are sequentially and cumulatively weighed. Also, liquid microingredients may be injected into the mix via ports in the lines running from the eductor to the feed ration mixers.

Each vibratory feeder consists of a flat rectangular, non-compartmentalized tray with a "wiper bar" on the end to dispense the microingredients into the catch basin at a smooth rate. After the microingredients are dispensed onto the vibratory feeders, gravity and vibration of the feeders—which remain upright—causes the microingredients to slide into the catch basin. Pressurized flush nozzles mounted over the top of the catch basin spray water into the basin, forcing the microingredients down the sides of the catch basin and into the catch basin outlet. The eductor mounted below the bottom of the catch basin uses water pressure to generate suction pressure at the catch basin outlet. Any mixing of the microingredients with the water carrier that occurs is incidental to the turbulence of the water coming from the flush nozzles, the turbulence generated by the eductor, and the turbulence generated by the flow of additive-carrying water to the batch mixers.

Another microingredient dispensing system is provided that comprises a microfeed dispensing station that mixes dry microingredients with air using an air eductor, a liquid and water pump station and application manifold for administration of water and liquid microingredients, and a spray hood under which both the dry ingredients and the liquid mixture are separately sprayed onto feed carried by a main conveyor belt. The microfeed dispensing station comprises a frame that supports multiple microingredient storage bins. Multiple dedicated weigh feeders, one for each storage bin, are positioned below the storage bins. An air operated gate valve (or, alternatively, a solenoid valve) below each storage bin is operable to quickly drop microingredients into the corresponding weigh feeder.

Each weigh feeder has a flow-rate-controllable dispensing augur operable to dispense ingredients from the weigh feeder into the micro bin stand's air eductor. The amount of each microingredient dispensed is determined by measuring and calculating a loss in weight of the corresponding weigh feeder. Microingredients are drawn into the line by the flow of pressurized air through the eductor. An air blower provides this flow of pressurized air and blows the entrained microingredients through a flow line to a dry nozzle underneath the spray hood.

BRIEF DESCRIPTION OF THE DRAWINGS

FIG. 5 illustrates the catch basin of the microingredient dispensing station of FIG. 2.

FIG. 6 illustrates the pump station of the micro-ingredient livestock feed additive dispensing and mixing apparatus of FIG. 1.

DETAILED DESCRIPTION OF THE INVENTION

Figure 1:
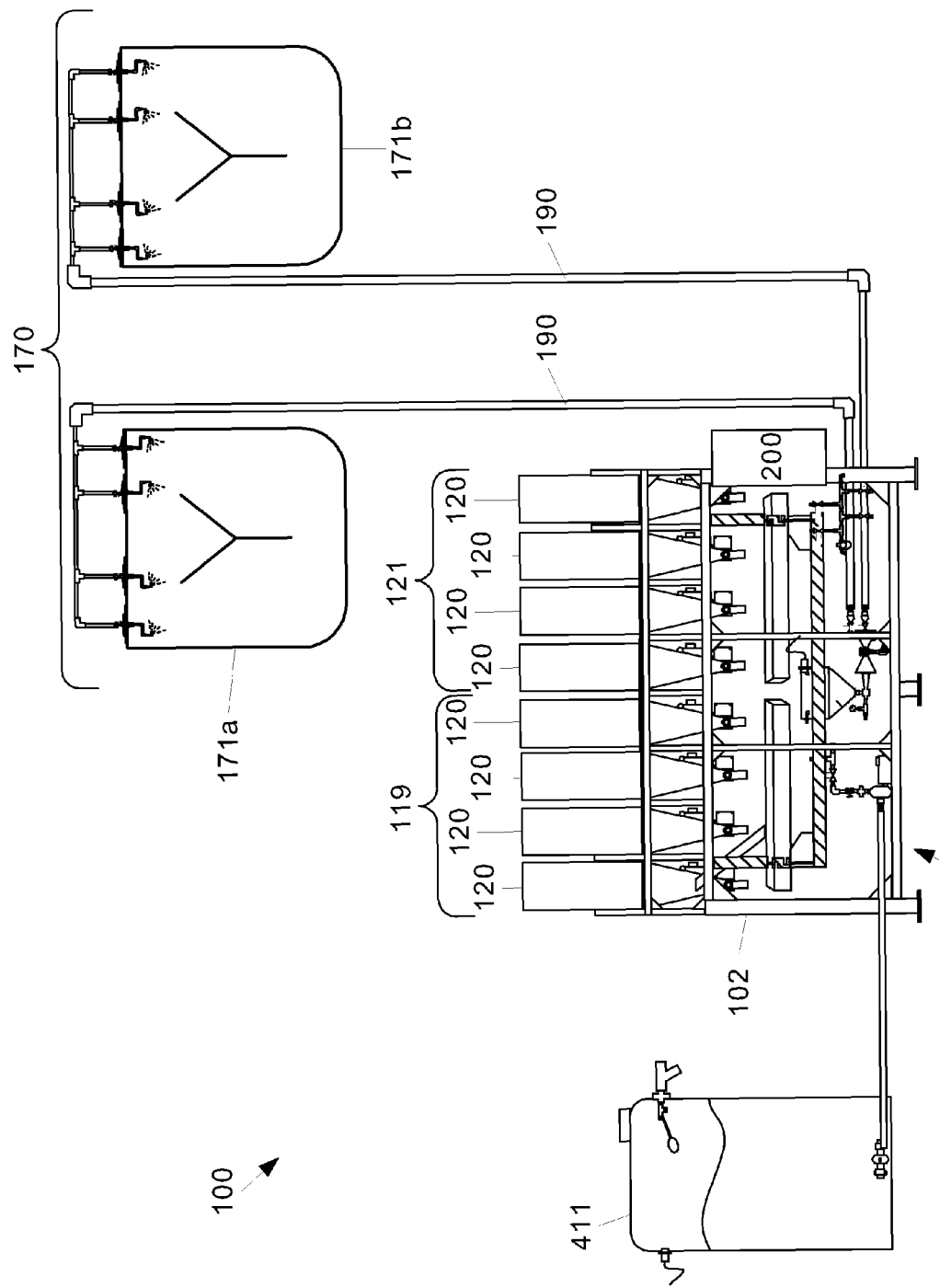
FIG. 1 illustrates a layout of one embodiment of a microingredient livestock feed additive dispensing and mixing apparatus.
Figure 2:
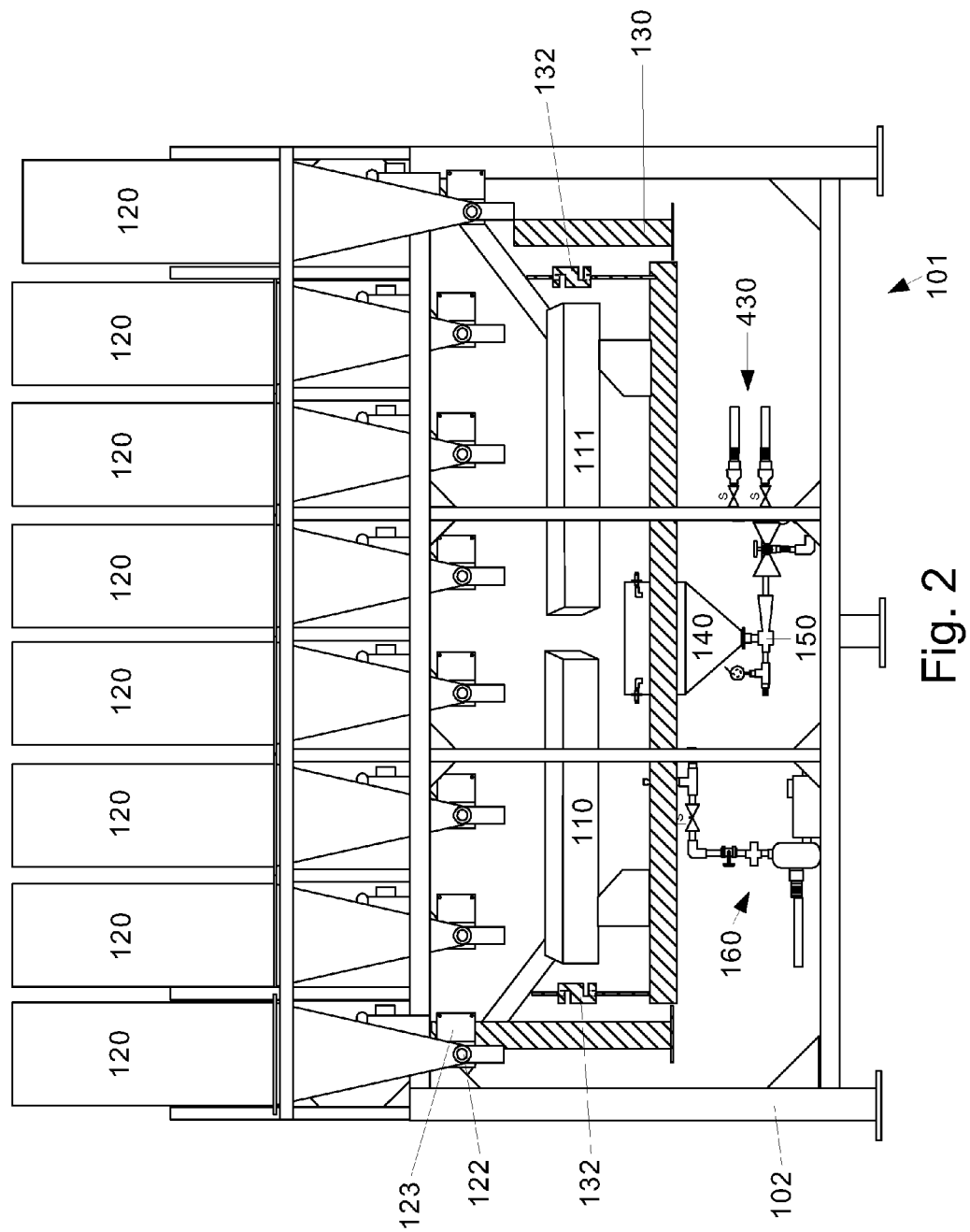
FIG. 2 illustrates the microingredient dispensing station of the micro-ingredient livestock feed additive dispensing and mixing apparatus of FIG. 1.
Figure 3:
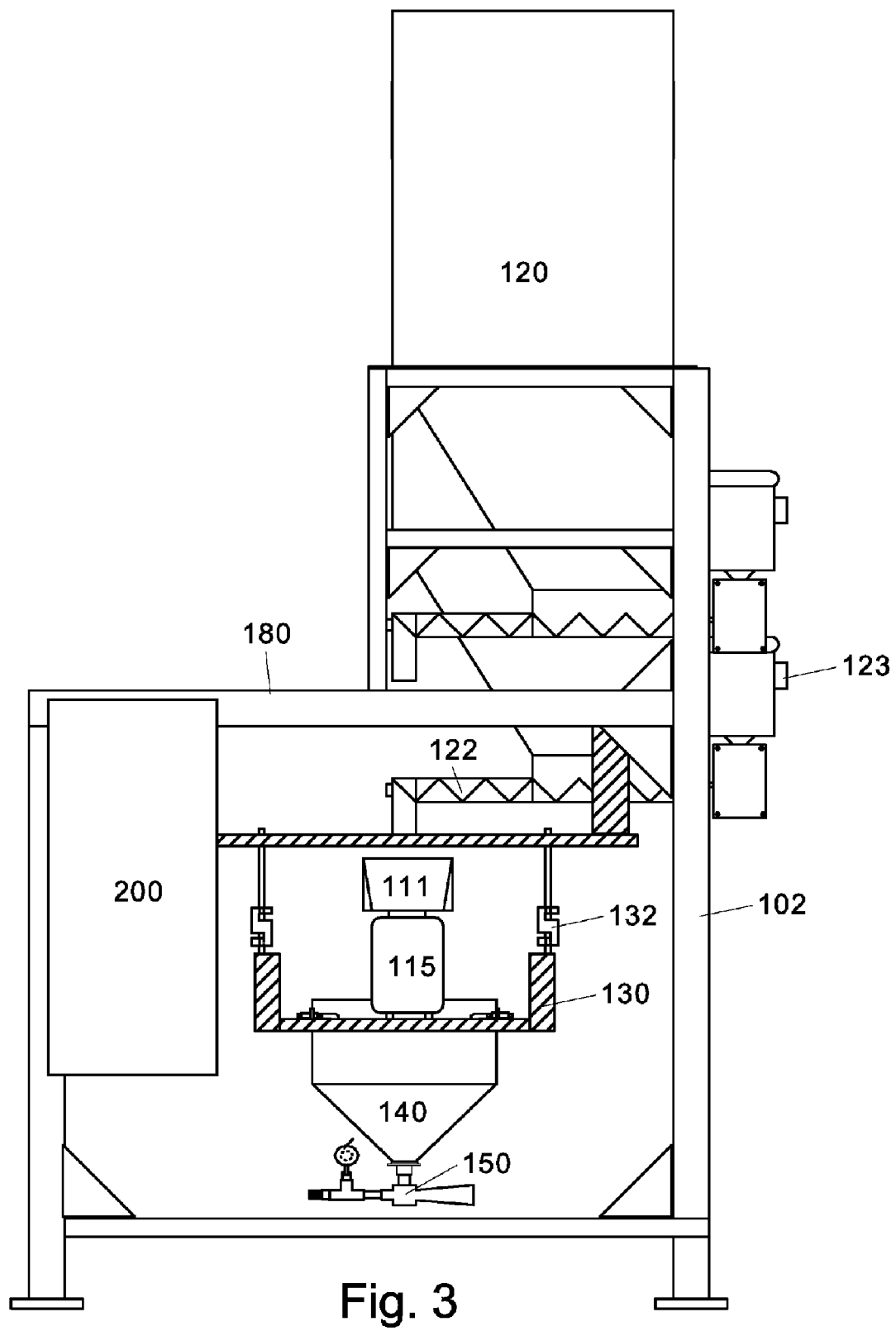
FIG. 3 is a side view of the microingredient dispensing station of FIG. 2.
Figure 4:
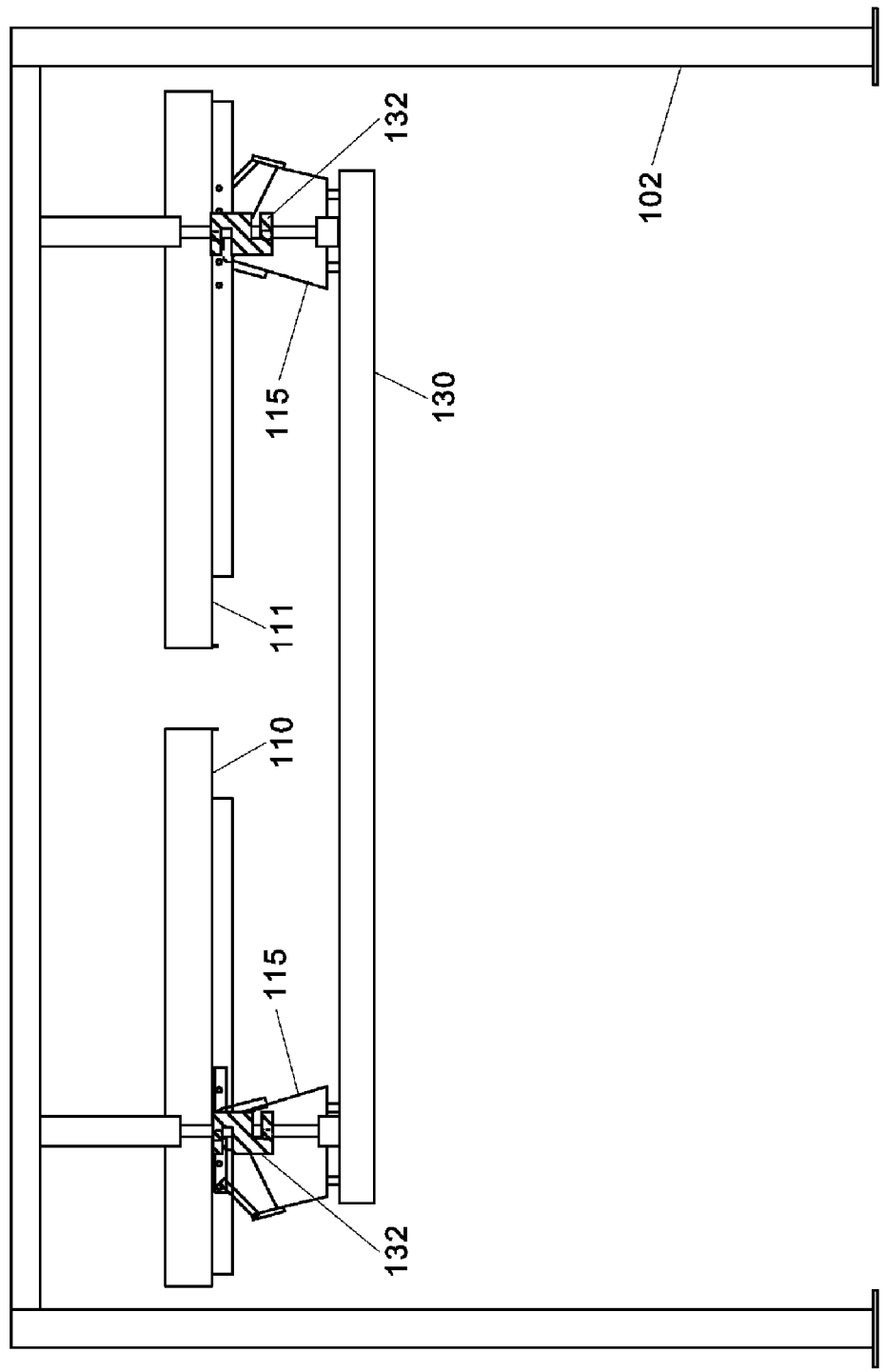
FIG. 4 illustrates the weigh scale and vibratory trays of the microingredient dispensing station of FIG. 2.

FIGS. 1-11 illustrate one embodiment of a micro-ingredient livestock feed additive dispensing and mixing apparatus 100. The apparatus 100 comprises a microingredient dispensing station 101 where microingredients are dispensed and a livestock feed mixing station 170 having one or more batch mixing tanks 171a, 171b where the microingredients and sprayed onto livestock feed.

The microingredient dispensing station 101 comprises a support frame 102 supporting at least a first set 119 of micro-ingredient bin containers 120, preferably also a second set 121 of micro-ingredient bin containers 120, and a walkway 180. A first vibratory tray or feeder 110 is oriented below the first set 119 of micro-ingredient bin containers 120, and a second vibratory tray or feeder 111 is oriented below the second set 121 of micro-ingredient bin containers 120 (if the second set 121 exists). Each of the micro-ingredient bin containers 120 has an independently operable dispenser 122 operated by an augur motor 123 that is operable to dispense micro-ingredient additives into the vibratory tray 110 or 111 below.

Each vibratory tray 110, 111 is mounted on a weigh scale 130 via a mechanical or electromechanical vibration-generating drive actuator or unit 115. In multiple-tray embodiments, the weigh scale 130 is a single weigh scale operable to weigh both vibratory trays 110, 111 simultaneously. The weigh scale 130 is suspended, via four load cells 132, from the support frame 102. The weight of the weigh scale 130 is distributed across the four load cells 132. A summing and filtering circuit 220 (FIG. 13) sums and filters the signals from the four load cells 132 to accurately determine the weight of the dispensed additives. The weigh scale 130 is capable of weighing ingredients to an accuracy of within +/−4 grams.

Each tray 110, 111 has a flat rectangular receiving surface 114 (FIG. 10), a discharge end 112, and side walls 116. They are preferably mounted in a slightly inclined, substantially horizontal position on the vibration-generating drive units 115 via springs and isolation supports to limit transmission of vibration to other equipment. In one embodiment, each drive unit 115 generates vibration by generating a sequence of discontinuous electromagnetic pulls on an armature or other member. In another embodiment, each drive unit 115 generates vibration by driving an eccentrically-weighted motor. The vibrations generated by the drive units 115 repeatedly throw the dispensed additives up and forward until they spill off the discharge end 112 of the tray 110, 111. All the while, the tray 110, 111's substantially horizontal orientation is maintained, and there is no rotation or significant tilting of the tray 110, 111.

Because each vibratory tray 110, 111 is non-compartmentalized, the vibration of the tray 110, 111 results in some mixing of the dispensed micro-ingredients. Each vibratory tray 110, 111 also preferably has a wiper bar or flap 113 mounted on the discharge end 112 of the vibratory tray 110, 111. The wiper bar or flap 113 slows the spill rate of the additives during vibration of the vibration tray 110, 111.

The microfeed dispensing station 101 also includes a stainless steel catch basin or receiving vessel 140 (FIG. 5) positioned below the discharge ends 112 of the vibratory trays 110, 111 in order to receive additives that spill off of the vibratory trays 110, 111. A plurality of flush nozzles 142 mounted near the top or upper portion 141 of the catch basin 140 direct fluid into the catch basin 140 to wash down the sides of the catch basin 140 and facilitate proper ingredient flow through the catch basin outlet 146. The flush nozzles 142 are floodjet-type nozzles with large orifices to prevent plugging and misting. A level float switch 145 alerts the system to shut down and alarm if water fills the receiving vessel 140.

The microfeed dispensing station 101 also includes an eductor 150 positioned below the stainless steel catch basin or receiving vessel 140. The eductor 150 comprises a Venturi chamber 151, an eductor nozzle 152 located on one side of the chamber 151, an eductor outlet 153 located on an opposite side of the chamber 151, and a suction inlet 154 adjacent the eductor nozzle 152 in fluid connection with the catch basin outlet 146. The eductor outlet 153 is in fluid communication with a mixer manifold 430 (FIG. 7) and delivery conduits 190 (FIG. 1) that direct the combination of fluid and additives to the livestock feed mixing station 170.

FIG. 6 illustrates the pump station 160. Water flows from a water tank 411 (FIG. 1) to the pump station 160 through inlet connection 161. Centrifugal pump 164 drives the water through water main line 169 toward an eductor supply outlet 166, in fluid connection with eductor nozzle 152, and a catch basin supply outlet 168 in fluid connection with flush nozzles 142. A trim valve 162 enables regulation of the outgoing pressure, indicated by pressure monitor 163, to the eductor supply outlet 166. A main water supply valve 165 is air-operated to open the same time the pump 164 runs and prevents the water tank 411 from draining when the system is not in use. A catch basin supply valve 167, downstream of the water supply valve 165, is air operated to provide water through the catch basin supply outlet 168 and to the flush nozzles 142.

The pump station 160, including pump 164, is located upstream of the eductor 150. This advantageously maintains the water pump 164 in isolation from, and free of contamination by, the additives that are pumped to the livestock feed mixing station 170.

Figure 7:
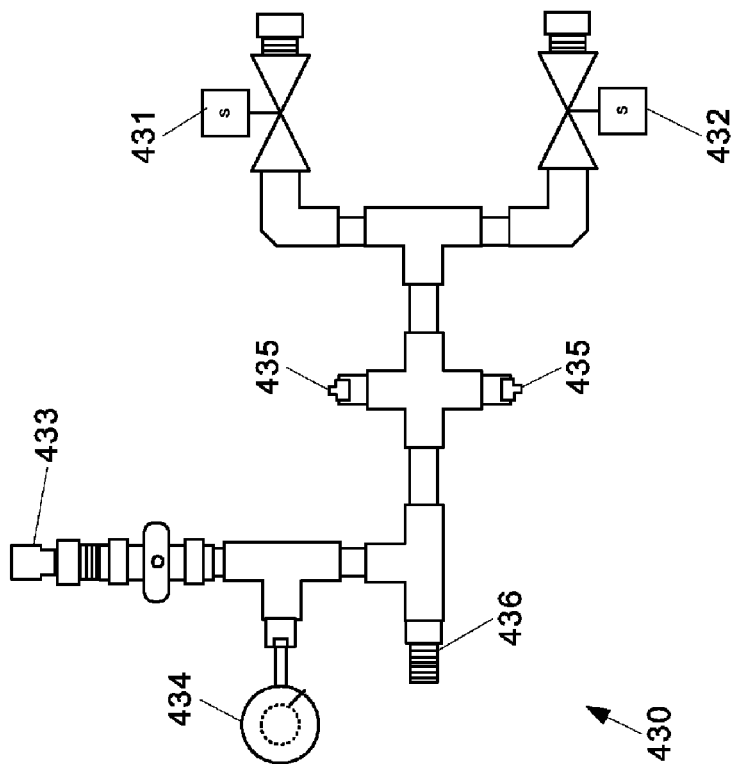
FIG. 7 illustrates the mixer manifold of the micro-ingredient livestock feed additive dispensing and mixing apparatus of FIG. 1.

FIG. 7 illustrates a mixer manifold 430 of one embodiment the micro-ingredient livestock feed additive dispensing and mixing apparatus 100 of FIG. 1. The mixer manifold 430 enables an operator to selectively direct the liquid mixture of microingredients to one of two, or both, batch mixing tanks 171a and 171b. The mixer manifold 430 comprises an inlet 436 in fluid connection with eductor outlet 153, an air-operated first tank valve 431 for directing a microingredient mixture to a first batch mixing tank 171a, and an air-operated second tank valve 432 for directing a microingredient mixture to a second batch mixing tank 171b. A pressure monitor 434 monitors the outgoing pressure, which is preferably kept under 25 psi. A drain port 433 is provided that can be used as a cleanout or test port. Injection ports 435 are provided through which liquid ingredients can be injected.

Figure 8:
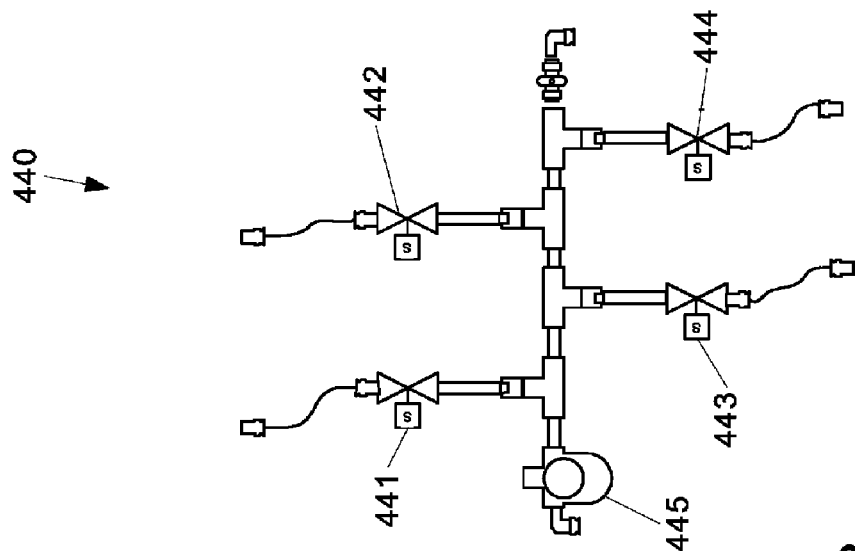
FIG. 8 illustrates the air manifold of the micro-ingredient livestock feed additive dispensing and mixing apparatus of FIG. 1.

FIG. 8 illustrates an air manifold 440 for operating the air-operated valves of the micro-ingredient livestock feed additive dispensing and mixing apparatus 100. Air manifold 440 comprises an air regulator and water trap 445 and a plurality of electrically-operated solenoid valves 441-444. A first solenoid valve 441 opens or closes an air supply to the air-operated water supply valve 165. A second solenoid valve 442 opens or closes an air supply to the air-operated catch basin supply valve 167. A third solenoid 443 opens or closes an air supply to the air-operated first tank valve 431. A fourth solenoid 444 opens or closes an air supply to the air-operated second tank valve 432. Each of the solenoid valves 441-444 can also be manually opened by turning a selector screw (not shown).

Figure 9:
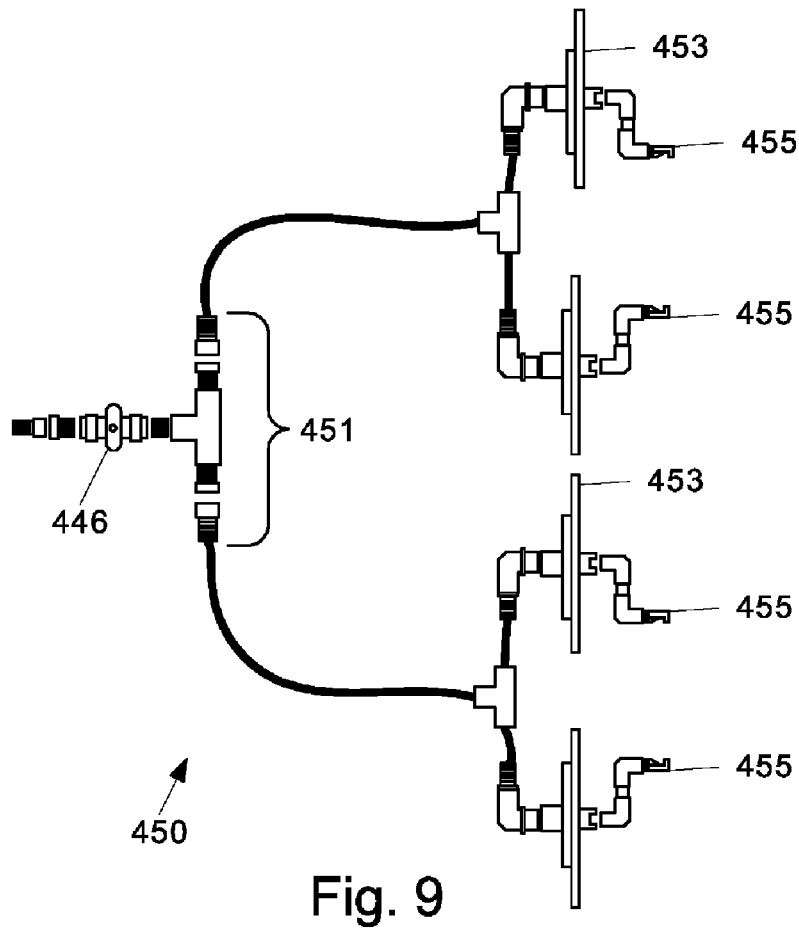
FIG. 9 illustrates one of the nozzle assemblies of the micro-ingredient livestock feed additive dispensing and mixing apparatus of FIG. 1.

FIG. 9 illustrates a nozzle assembly 450 for the livestock feed mixing station 170. Nozzle assembly 450 comprises nozzles 455, quick-release mounting plates 453 for mounting the nozzles to the outside of one of the batch mixing tanks 171a, 171b, and a connection manifold 451 that splits the stream of additive-bearing fluid to nozzles 455 on opposite sides of the mixing tanks 171a, 171b.

Figure 13:
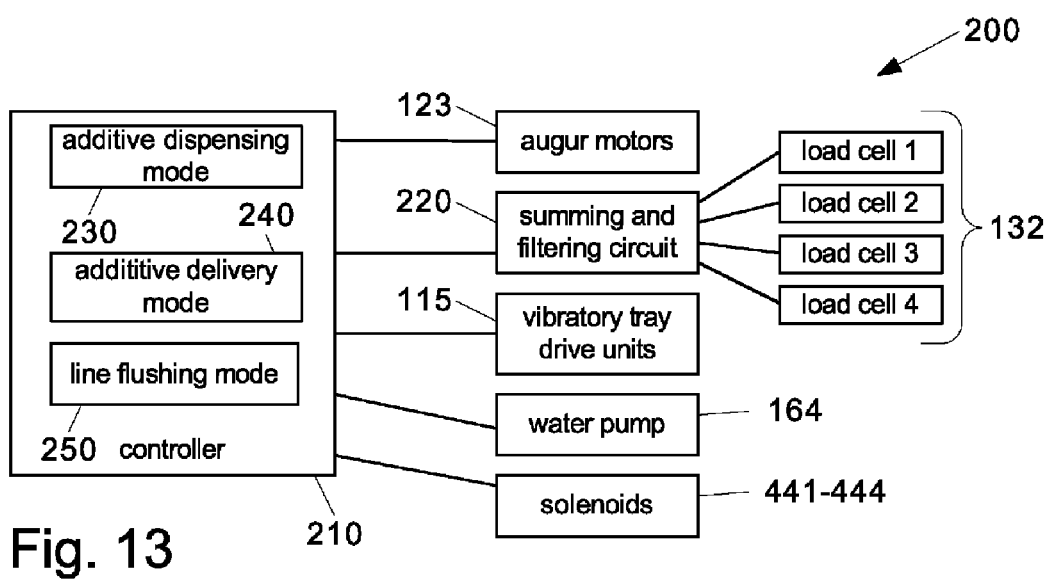
FIG. 13 is a logical block diagram of a control system for the micro-ingredient livestock feed additive dispensing and mixing apparatus.
Figure 10:
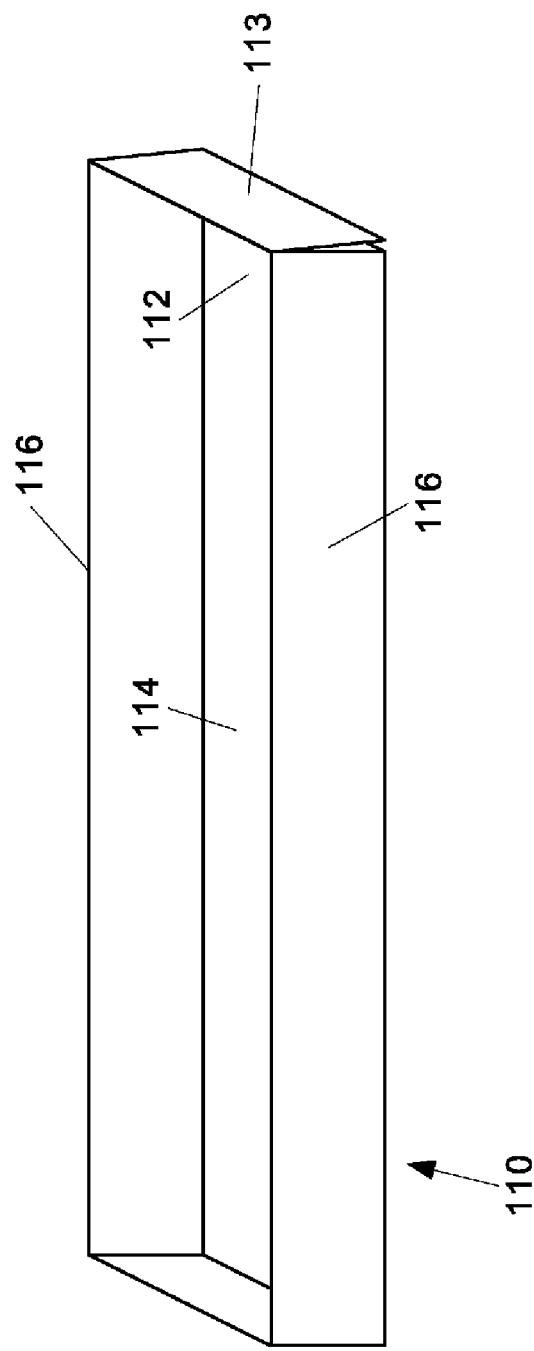
FIG. 10 is a perspective view of one of the vibratory trays of the micro-ingredient livestock feed additive dispensing and mixing apparatus of FIG. 1.

FIG. 13 is a logical block diagram of a control system 200 for the micro-ingredient livestock feed additive dispensing and mixing apparatus 100. Control system 200 comprises at least one controller 210 and a summing and filtering circuit 220. The at least one controller 210 operates the augur motors 123 of the independently operable dispensers 122, the vibratory tray drive units 115, the water pump 164, and solenoid valves 441-444. The at least one controller 210 has several modes of operation, including an additive dispensing mode 230, an additive delivery mode 240 and a line-flushing mode 250.

In the additive dispensing mode 230, the at least one controller 210 operates the augur motors 123 to dispense the microingredient additives, one at a time, from the microingredient bin containers 120 into the vibratory trays 110, 111, where the dispensed additives are sequentially and cumulatively weighed. The at least one controller 210 receives signals from the summing and filtering circuit 220 and monitors the cumulative weight of the additives, and controls the timing and speed of the augur motors 123 as a function of the sensed cumulative weight.

After the additives have been dispensed onto the trays 110, 111, the at least one controller 210 switches into the additive delivery mode 240. The at least one controller 210 activates the drive units 115 to cause the trays 110, 111 to vibrate. Vibration of the trays 110, 111—which remain upright—causes the additives to travel toward and into the catch basin 140. Meanwhile, the at least one controller 210 activates pump 164 and solenoid 441 and 442 to direct a first flow of pressurized water to pressurized flush nozzles 142 and a second flow of pressurized water, preferably at a pressure of between 55 and 70 psi, into the Venturi chamber 151. The flush nozzles 142 mounted near the top of the catch basin 140 spray water into the catch basin 140, forcing the additives down the sides of the catch basin 140 and into the catch basin outlet 146.

Pressurized water forced by water pump 164 into the Venturi chamber 151 generates suction at suction inlet 154. This suction draws and entrains the additives and water from the catch basin 140 into the water flowing through the Venturi chamber 151, the mixture of which is discharged through the eductor outlet 153 into the delivery conduits 190 and to the livestock feed mixing station 170. Any mixing of the additives with the water is incidental to the turbulence of the water coming from the flush nozzles 142, the turbulence generated by the eductor 150, and the turbulence generated by the flow of additive-carrying water to the batch mixers 170.

In the line-flushing mode 250, the at least one controller 210 deactivates the drive units 115, stopping vibration of the trays 110, 111. The controller 210 also deactivates solenoid 442, which turns off the catch basin supply valve 167, thereby stopping the flow of water through the flush nozzles 142. During the line-flushing mode, the controller 210 continues to operate water pump 164 and solenoid 441 to continue directing a flow of pressurized water through the eductor nozzle 152 of the eductor 150. This continues to generate suction at suction inlet 154, drawing air into Venturi chamber 151, which mixes with the flow of pressurized water. The resulting turbulent mixture of water and air cleans the delivery conduits 190 of residue.

Figure 11:
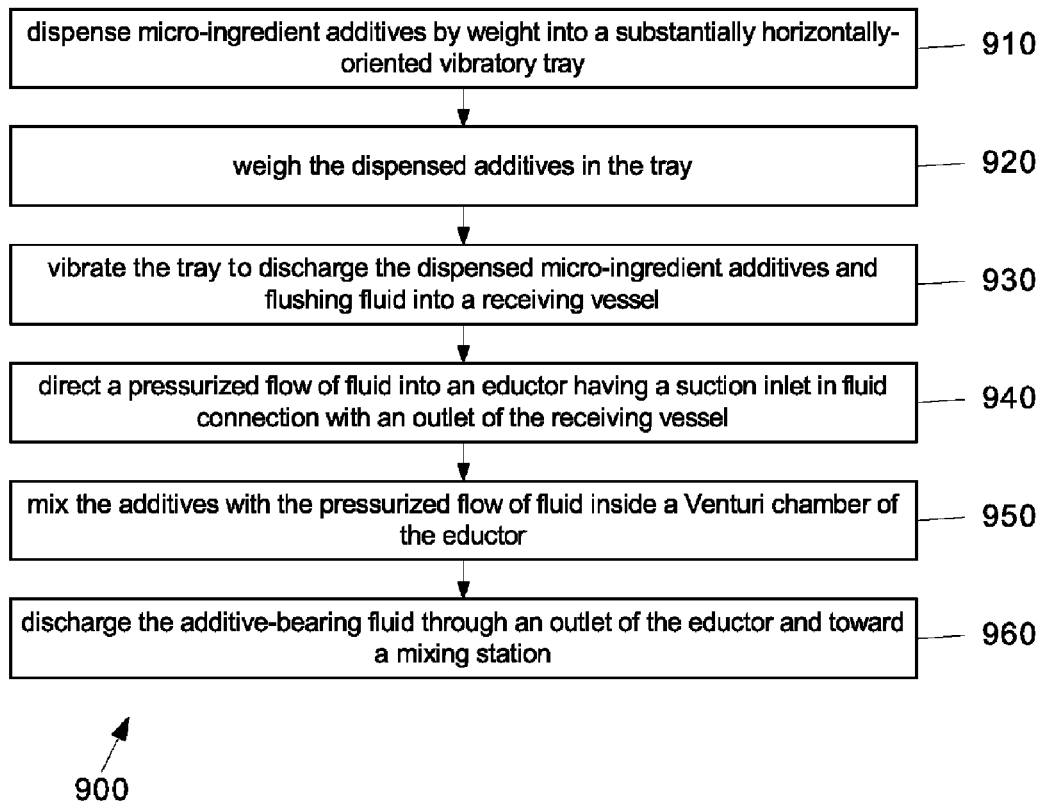
FIG. 11 illustrates a method of dispensing micro-ingredient additives to a livestock feed ration.

FIG. 11 illustrates a method 900 of dispensing micro-ingredient additives to a livestock feed ration. In step 910, dispense micro-ingredient additives by weight into a substantially horizontally-oriented vibratory tray. In step 920, weigh the dispensed additives in the tray. In step 930, vibrate the tray to discharge the dispensed micro-ingredient additives and flushing fluid into a receiving vessel. In step 940, direct a pressurized flow of fluid into an eductor having a suction inlet in fluid connection with an outlet of the receiving vessel. In step 950, mix the additives with the pressurized flow of fluid inside a Venturi chamber of the eductor, resulting in a flow of additive-bearing fluid. In step 960, discharge the additive-bearing fluid through an outlet of the eductor and toward a mixing station.

Figure 12:
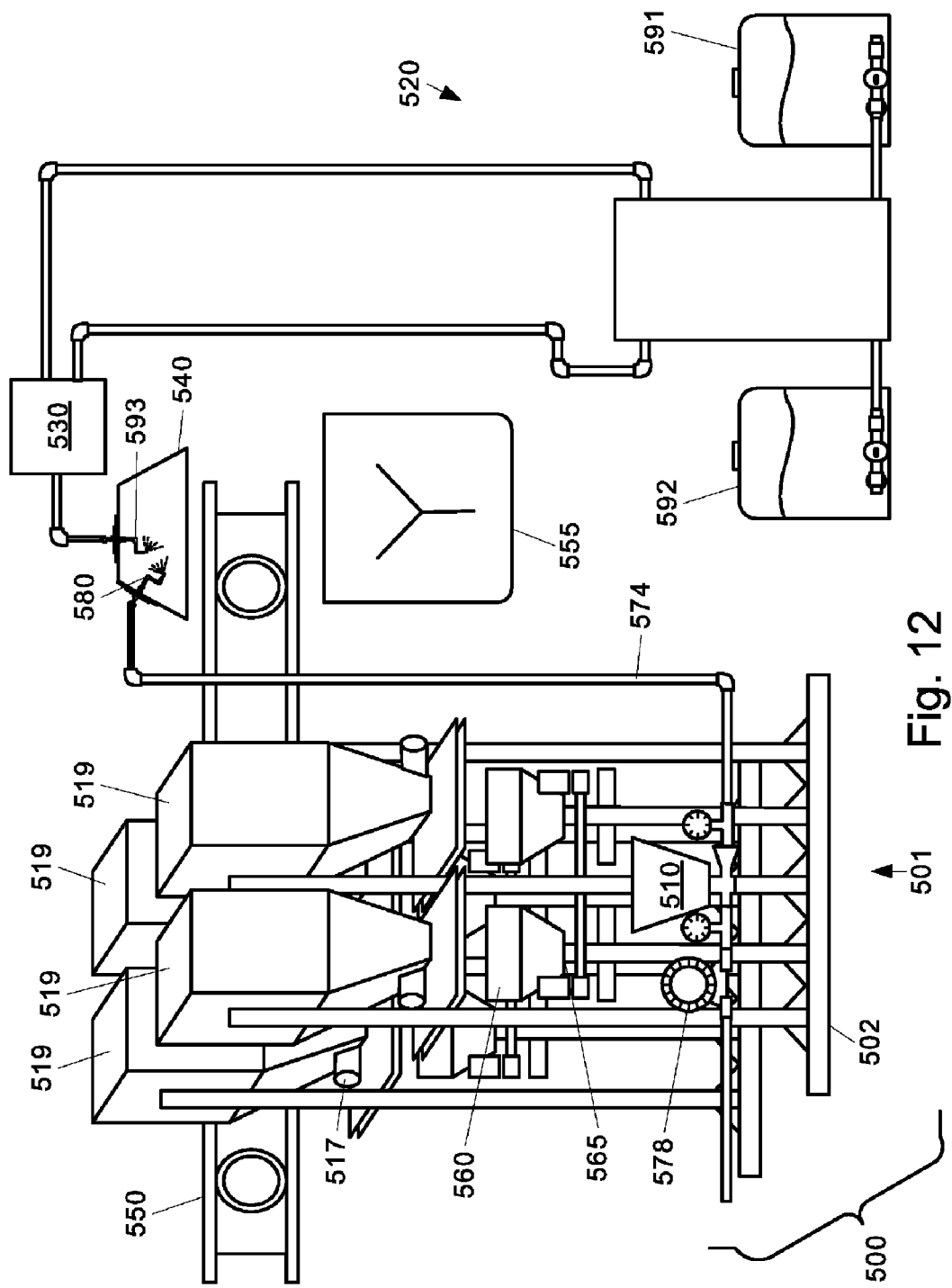
FIG. 12 illustrates another embodiment of a micro-ingredient livestock feed additive dispensing and mixing apparatus.

FIG. 12 illustrates another embodiment of a micro-ingredient livestock feed additive dispensing and mixing apparatus 500. The apparatus 500 comprises a microfeed dispensing station 501 that mixes dry microingredients with air using an air eductor 510, a liquid and water pump station 520 and application manifold 530 for administration of water and liquid microingredients, and a spray hood 540 under which both the dry ingredients and the liquid mixture are separately sprayed onto feed carried by a main conveyor belt 550. The conveyor belt 550 carries the treated feed to a continuous mixer 555, where the treated feed is mixed.

The microfeed dispensing station 501 comprises a frame 502 that supports multiple microingredient storage bins 519. Multiple dedicated weigh feeders 560, one for each storage bin 519, are positioned below the storage bins 519. An air operated gate valve (or, alternatively, a solenoid valve) 517 below each storage bin 519 is operable to quickly drop microingredients into the corresponding weigh feeder 560.

Each weigh feeder 560 has a flow-rate-controllable dispensing augur 565 operable to dispense ingredients from the weigh feeder 560 into the micro bin stand's air eductor 510. The amount of each microingredient dispensed is determined by measuring and calculating a loss in weight of the corresponding weigh feeder 560.

A flow line 574 takes microingredients dispensed by the microfeed dispensing station 501 and directs it to a dry nozzle 580 underneath the spray hood 540. Microingredients drawn into the line 574 by the eductor 510 are blown through the line with an air blower 578 and mixed within the line 574 via a static mixer (not shown).

When a recipe or ration calls for certain ingredient, a control system causes the storage bin 519 for that ingredient to dispense the ingredient into the corresponding weigh feeder 560. Next, the control system causes the dispensing augur 565 below the weigh feeder 560 to start dispensing the microingredient. The weigh feeder 560 is then periodically weighed (e.g., about once every 5 seconds) to calculate (via a loss of weight algorithm) the actual unit weight/unit time being dispensed. This actual unit weight/unit time being dispensed is then compared with a target dispensing rate. The speed of the augur 565 is then adjusted, through feedback, until its actual dispensing rate approximates the target dispensing rate.

The microfeed dispensing station 501 is operable to dispense microingredients continuously. When a given weigh feeder 560 is almost empty, a "snap shot" weight reading is taken. This weight is held during the time the weigh feeder 560 is being refilled from the storage bin 519. When the refill is completed, the associated scale is allowed to settle (milliseconds), and another "snap shot" weight reading is taken. The total weight added to the weigh feeder 560 is equal to the difference between the two snapshot weight readings plus an estimated weight (based on past measurements using the same dispensing augur speed) dispensed during the fill operation. This estimated weight is then added to the measured actual weight.

Liquid microingredients are supplied through a pump station 520 that delivers a flow of water from a main supply tank 591 and another flow or flows of liquid microingredients from a liquid additive supply 592 to the application manifold 530. The rate at which liquid ingredients are delivered are determined by volumetric flow sensors (not shown). The application manifold 530 is a static mixer that combines the liquid microingredients with water. The liquid microingredient-and-water mixture is delivered from the manifold 530 to a wet nozzle 593 underneath the spray hood 540. The spray patterns from the dry and wet nozzles are cross-combined so that the dry powders have a better chance of sticking to the dry feed.

Although the foregoing specific details describe several preferred embodiments of the invention, persons reasonably skilled in the art will recognize that various changes may be made in the details of the method and apparatus of this invention without departing from the spirit and scope of the invention as defined in the appended claims. Therefore, it should be understood that, unless and to the extent expressly set forth in the claims, this invention is not limited to the specific details shown and described herein.

I claim:

1. A micro-ingredient livestock feed additive dispensing and mixing apparatus comprising:
   a vibratory tray having a discharge end;
   a plurality of micro-ingredient bin containers oriented above, and operable to dispense micro-ingredient additives into, the vibratory tray;
   a weigh scale operable to weigh the vibratory tray;
   a drive actuator operable to vibrate the vibratory tray, and thereby cause micro-ingredient additives dispensed into the vibratory tray to spill off of the discharge end of the vibratory tray;
   a catch basin situated below the discharge end of the vibratory tray in order to receive the discharged additives;
   a plurality of flush nozzles situated adjacent an upper portion of the catch basin and operable to direct a liquid fluid into the catch basin;
   an eductor situated below an outlet of the catch basin, the eductor comprising a Venturi chamber, an eductor nozzle located on one side of the chamber, an eductor outlet located on an opposite of the Venturi chamber, and a suction inlet adjacent the eductor nozzle in fluid connection with the catch basin outlet;
   a pump for supplying pressurized liquid fluid to the eductor nozzle;
   a batch mixing tank operable to mix the additives with a batch of livestock feed;
   a plurality of batch mixer nozzles situated above the batch mixing tank operable to spray the additives into the batch of livestock feed; and
   a delivery conduit providing a fluid connection between the eductor outlet and the batch mixer nozzles.

2. The apparatus of claim 1, wherein the vibratory tray is non-compartmentalized.

3. The apparatus of claim 2, wherein the vibratory tray has a substantially flat micro-ingredient additive receiving surface and the vibratory tray is mounted substantially horizontally.

4. The apparatus of claim 3, wherein the drive actuator is operable to cause the dispensed additives to spill off a discharge end of the vibratory tray while maintaining the vibratory tray's substantially horizontal orientation and without rotating or significantly tilting the vibratory tray.

5. The apparatus of claim 4, further comprising a wiper bar mounted on the discharge end of the vibratory tray, the wiper bar being operable to slow a spill rate of the additives during vibration of the vibratory tray.

6. The apparatus of claim 5, further comprising:
   a second vibratory tray having an discharge end situated above the catch basin; and
   a second set of micro-ingredient bin containers oriented above, and operable to dispense micro-ingredient additives into, the second vibratory tray;
   wherein the weigh scale is a single weigh scale that is operable to weigh both vibratory trays simultaneously.

7. The apparatus of claim 1, further comprising a controller operable to operate the apparatus in an additive delivery mode and a line-flushing mode;
   wherein during the additive delivery mode, the controller causes the vibratory feeder to vibrate while causing the flush nozzles to direct a pressurized liquid into the catch basin while causing the pump to supply a second source of pressurized liquid into the eductor; and
   wherein during the line-flushing mode, the controller stops the vibration of the vibratory feeder and turns off the flush nozzles while continuing to direct pressurized liquid through the eductor nozzle of the eductor; whereby the eductor receives air from the suction inlet that mixes with the liquid and operates to clean the delivery conduit of residue.

8. In a micro-ingredient livestock feed additive dispensing and mixing apparatus comprising a plurality of microingredient storage bins with independently operable dispensers, a catch basin adapted to receive dispensed micro-ingredient additives, and conduit to direct a combination of a fluid carrier and micro-ingredient additives to a livestock feed mixing station, the improvement comprising:
   an eductor comprising a Venturi chamber, an eductor nozzle located on one side of the chamber, an eductor outlet located on an opposite of the Venturi chamber, and a suction inlet in fluid connection with an outlet of the catch basin; and
   a pump for supplying pressurized liquid fluid to the eductor nozzle;
   wherein the eductor outlet is in fluid communication with the conduit that directs the combination of fluid and micro-ingredient additives to the livestock feed mixing station;
   whereby the additives from the catch basin are entrained by the flow of pressurized liquid fluid through the Venturi chamber and discharged through the eductor outlet to the conduit and to the livestock feed mixing station; and
   a controller operable to operate the apparatus in a line-flushing mode, wherein during the line-flushing mode, the controller causes the dispensing of micro-ingredients into the catch basin to cease and turns off a source of flushing liquid into the catch basin while continuing to operate the pump to direct pressurized liquid fluid through the eductor nozzle; whereby the eductor receives air from the suction inlet that mixes with the pressurized fluid, creating a turbulent liquid and air mixture that operates to clean the conduit of residue.

9. The micro-ingredient livestock feed additive dispensing and mixing apparatus of claim 8, the improvement further comprising:
- a substantially horizontally-mounted, non-compartmentalized vibratory tray oriented below at least some of the microingredient storage bins, the vibratory tray having a discharge end;
- a weigh scale utilizing multiple load cells to weigh the vibratory tray; and
- a drive actuator operable to vibrate the vibratory tray, and thereby cause micro-ingredient additives dispensed into the vibratory tray to spill off of the discharge end of the vibratory tray, while maintaining the vibratory tray's substantially horizontal orientation and without rotating or substantially tilting the vibratory tray.

10. The apparatus of claim 1, further comprising:
- filtering circuitry that sums and filters signals from four load cells to accurately determine the weight of the dispensed additives; and
- wherein the drive actuator is operable to vibrate the vibratory tray, and thereby cause micro-ingredient additives dispensed into the vibratory tray to spill off of the discharge end of the vibratory tray, while maintaining a substantially horizontal orientation of and without rotating or substantially tilting the vibratory tray.

11. The micro-ingredient livestock feed additive dispensing and mixing apparatus of claim 1, further comprising:
- a second vibratory tray having a discharge end situated above the catch basin;
- a second set of micro-ingredient storage bins oriented above, and operable to dispense micro-ingredient additives into, the second vibratory tray; and
- wherein the weigh scale is a single weigh scale that is operable to weigh both vibratory trays simultaneously.

* * * * *